(12) United States Patent
Venkataranmani et al.

(10) Patent No.: US 8,737,460 B2
(45) Date of Patent: May 27, 2014

(54) EQUALIZER AND DETECTOR ARRANGEMENT EMPLOYING JOINT ENTROPY-BASED CALIBRATION

(75) Inventors: Raman Venkataranmani, Longmont, CO (US); William Michael Radich, Longmont, CO (US)

(73) Assignee: Seagate Technology, LLC, Cupertino, CA (US)

( * ) Notice: Subject to any disclaimer, the term of this patent is extended or adjusted under 35 U.S.C. 154(b) by 141 days.

(21) Appl. No.: 13/550,321

(22) Filed: Jul. 16, 2012

(65) Prior Publication Data

US 2014/0016688 A1 Jan. 16, 2014

(51) Int. Cl.
*H04L 27/01* (2006.01)

(52) U.S. Cl.
USPC ............ 375/232; 375/229; 375/230; 375/316

(58) Field of Classification Search
USPC .................. 375/232, 229, 230, 316
See application file for complete search history.

(56) References Cited

U.S. PATENT DOCUMENTS

| 6,178,209 | B1 | 1/2001 | Hulyalkar et al. | |
| 6,850,563 | B1 | 2/2005 | Hulyalkar et al. | |
| 7,012,976 | B1 * | 3/2006 | Tortelier et al. | 375/341 |
| 7,031,405 | B1 | 4/2006 | Touzni et al. | |
| 7,440,208 | B1 * | 10/2008 | McEwen et al. | 360/39 |
| 7,864,471 | B2 | 1/2011 | Sridhara et al. | |
| 7,917,563 | B1 | 3/2011 | Shih et al. | |
| 8,358,683 | B2 * | 1/2013 | Graffouliere | 375/232 |
| 8,576,903 | B2 * | 11/2013 | Raphaeli et al. | 375/233 |
| 2006/0067434 | A1 * | 3/2006 | Kovintavewat et al. | 375/340 |
| 2006/0285852 | A1 * | 12/2006 | Xi et al. | 398/141 |
| 2009/0207900 | A1 * | 8/2009 | Beukema et al. | 375/232 |
| 2012/0212849 | A1 * | 8/2012 | Xu et al. | 360/32 |

OTHER PUBLICATIONS

Jackson, "Data Detection Algorithms for Perpendicular Magnetic Recording in the Presence of Strong Media Noise", Dec. 2008, 243 pages.
Kuznetsov et al., "Macroscopic and Microscopic Approaches in Sector Failure Rate Estimation", IEEE Transactions on Magnetics, vol. 44, No. 1, Jan. 2008, pp. 187-192.
Ortega et al., "A Minimum Relative Entropy Principle for Learning and Acting", Journal of Artificial Intelligence Research, vol. 38, 2010, pp. 475-511, Aug. 2010.
Hou et al., "Reservoir-Parameter Identification Using Minimum Relative Entropy-Based Bayesian Inversion of Seismic AVA and Marine CSEM Data", Geophysics, vol. 71, No. 6, 2006, pp. 77-88, Nov. 2006.
Chen et al., "Bi-Directional Sova Decoding for Turbo-Codes", Communications Letters, IEEE, vol. 4, No. 12, Dec. 2000, pp. 405-407.

\* cited by examiner

*Primary Examiner* — Kenneth Lam
(74) *Attorney, Agent, or Firm* — Hollingsworth Davis, LLC (57) ABSTRACT

An equalizer configured to receive a data signal from a channel. The detector is coupled to the equalizer, and a calibration unit is coupled with the equalizer and the detector. The calibration unit is configured to jointly calibrate the equalizer and the detector using a metric subject to an entropy-preserving equalizer constraint.

20 Claims, 6 Drawing Sheets

EQUALIZER AND DETECTOR ARRANGEMENT EMPLOYING JOINT ENTROPY-BASED CALIBRATION

SUMMARY

Embodiments of the disclosure are directed to an apparatus which includes an equalizer configured to receive a data signal from a channel. A detector is coupled to the equalizer, and a calibration unit is coupled with the equalizer and the detector. The calibration unit is configured to jointly calibrate the equalizer and the detector using a metric subject to an entropy-preserving equalizer constraint.

Various method embodiments involve receiving a data signal from a channel, equalizing the data signal using an equalizer, and detecting a user information component of the data signal. Method embodiments also involve calibrating the equalizer and the detector jointly using a metric subject to an entropy-preserving equalizer constraint.

These and other features and aspects which characterize various embodiments can be understood in view of the following detailed discussion and the accompanying drawings.

DETAILED DESCRIPTION

Embodiments of the disclosure are directed to equalizer and detector arrangements for processing data signals transmitted through a channel. Embodiments of the disclosure are directed to jointly calibrate an equalizer and a detector using a metric subject to an entropy-preserving equalizer constraint. Jointly calibrating the equalizer and the detector preferably involves producing a decomposition that satisfies the entropy-preserving equalizer constraint, such as by producing the decomposition using a causal factor, an anticausal factor, and a delay factor.

The metric is preferably an entropy-based metric. For example, the metric can be representative of a statistical distance measure (e.g., a Kullback-Leibler (KL) distance or relative entropy) between a modeled probability distribution functions (PDF) and an actual channel PDF, which is unknown. Jointly calibrating the equalizer and detector involves determining a PDF from a class of modeled PDFs using the statistical distance measure (e.g., minimum relative entropy (MRE)).

Particular embodiments are directed to using an MRE metric to jointly implement a finite impulse response (FIR) equalizer and a soft output Viterbi algorithm (SOVA) detector coupled to a channel. While many embodiments described herein use an MRE metric, other embodiments can use any entropy-based metric that represents a statistical distance between a modeled PDF and the actual channel PDF. The channel can be any kind of channel, such as a communication channel or a read channel of a data storage device (e.g., a magnetic recording device).

Embodiments of the disclosure eliminate the need for a partial response target and target optimization. Various embodiments are directed to an apparatus comprising an equalizer configured to receive a data signal having inter-symbol interference from a channel and a detector coupled to the equalizer, wherein the detector and equalizer are configured to operate cooperatively to decode a user information component from the data signal without using a partial response target. Some embodiments of the disclosure provide for enhanced equalization signal-to-noise ratio (SNR) performance for a fixed complexity SOVA detector. Implementing a FIR equalizer and SOVA detector arrangement according to various embodiments involves use of training data at operating noise.

According to various embodiments of the disclosure, a data signal comprising a user information component is transmitted through a channel and received at a receive location. An equalizer, a detector, and a calibration unit are provided at the receive location and operate cooperatively to detect the user information component that can be distorted by the channel. The equalizer is configured to perform equalization to remove the effect of the channel from the received signal, in particular inter-symbol interference (ISI) and data-dependent noise. The detector is configured to detect the user information component from the equalized signal. In various embodiments, the equalizer is implemented using a linear FIR filter calibrated to minimize the variance of the error signal, and the detector comprises a SOVA module. The calibration unit is configured to calibrate the equalizer and the detector jointly using the entropy-based metric for enhancing detection accuracy.

A typical conventional approach to designing a FIR equalizer and SOVA detector involves a two-step training process. First, the equalizer filter is trained or calibrated to minimize the mean square error (MSE) of the equalization error with respect to a fixed partial response (PR) target filter. The PR target is chosen by trial and error. Then, the SOVA detector uses a data-dependent noise prediction (DDNP) model that is calibrated to minimize the individual noise variances. The DDNP model comprises a whitening filter and a mean shift for each transition in a trellis construct for the SOVA detector. Using this two-step calibration approach, the FIR equalizer is chosen by an exhaustive search over integer targets followed by simulation.

Embodiments of present disclosure are directed to finding the best FIR equalizer and DDNP model jointly without binding the model to a PR target. An entropy-based metric, such as minimum relative entropy, is used to jointly design the equalizer and the DDNP model parameters in a computationally efficient way. The joint calibration scheme enhances (e.g., optimizes) performance of the equalizer and the detector, preferably with a one-step calibration and without using a PR target. According to various embodiments, a useful design metric is one that provides for a minimum relative entropy or a minimum Kullback-Leibler (KL) distance between a determined PDF of a modeled channel and a PDF of the actual channel.

According to various embodiments, methods for jointly calibrating an equalizer and a detector based on the entropy-based metric involve receiving a data signal from a channel by an equalizer, equalizing the data signal using the equalizer, and detecting a user information component of the data signal. According to some embodiments, methods for jointly calibrating an equalizer and a detector involve receiving an equalized signal from the equalizer, implementing a Viterbi algorithm and a trellis construct comprising states and transitions among the states, implementing a data-dependent noise predictive (DDNP) model, whitening a signal and storing mean shifts for each transition in the trellis construct, performing an estimation of the user information component, determining a modeled PDF from a class of modeled PDFs, and providing updates to the equalizer and the detector adaptively and substantially in real-time.

In accordance with other embodiments, apparatuses for performing joint calibration using an entropy-based metric, such as an MRE metric, include an equalizer configured to receive a data signal from a channel, a detector coupled to the equalizer, and a calibration unit coupled with the equalizer and the detector, the calibration unit configured to jointly calibrate the equalizer and the detector using the MRE metric. According to some embodiments, apparatuses for performing joint calibration using minimum relative entropy include a detector comprising a soft output Viterbi algorithm (SOVA) module and a data-dependent noise predictive (DDNP) module coupled with the SOVA module. The SOVA module is configured to implement a Viterbi algorithm and a trellis construct comprising states and transitions among the states. The DDNP module comprises a whitening filter and a storage device configured to store mean shifts for each transition in the trellis construct. According to some embodiments, apparatuses for performing joint calibration using MRE include an equalizer comprising a causal equalizer and an anti-causal equalizer, and a calibration unit comprising an adaptive algorithm module configured to provide updates to the equalizer and the detector with an adaptive MRE architecture.

Figure 1:
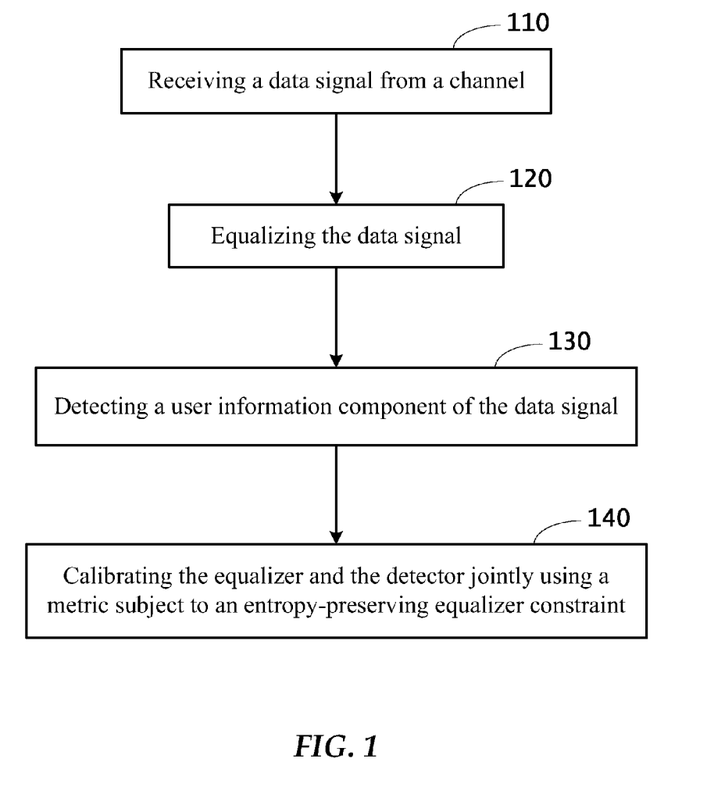
FIG. 1 illustrates various processes for jointly calibrating an equalizer and a detector coupled to a channel in accordance with various embodiments.

Referring now to FIG. 1, there is illustrated various processes for jointly calibrating an equalizer and a detector coupled to a channel in accordance with various embodiments. The method illustrated in FIG. 1 involves receiving 110 a data signal from a channel by an equalizer. The data signal comprises a user information component to be detected. The method further includes equalizing 120 the data signal using the equalizer, and detecting 130 the user information component of the data signal by a detector. The equalizer and detector are calibrated jointly 140 using a metric subject to an entropy-preserving equalizer constraint. The joint calibration methodology according to various embodiments obviates the need to use a partial response target.

Figure 2:
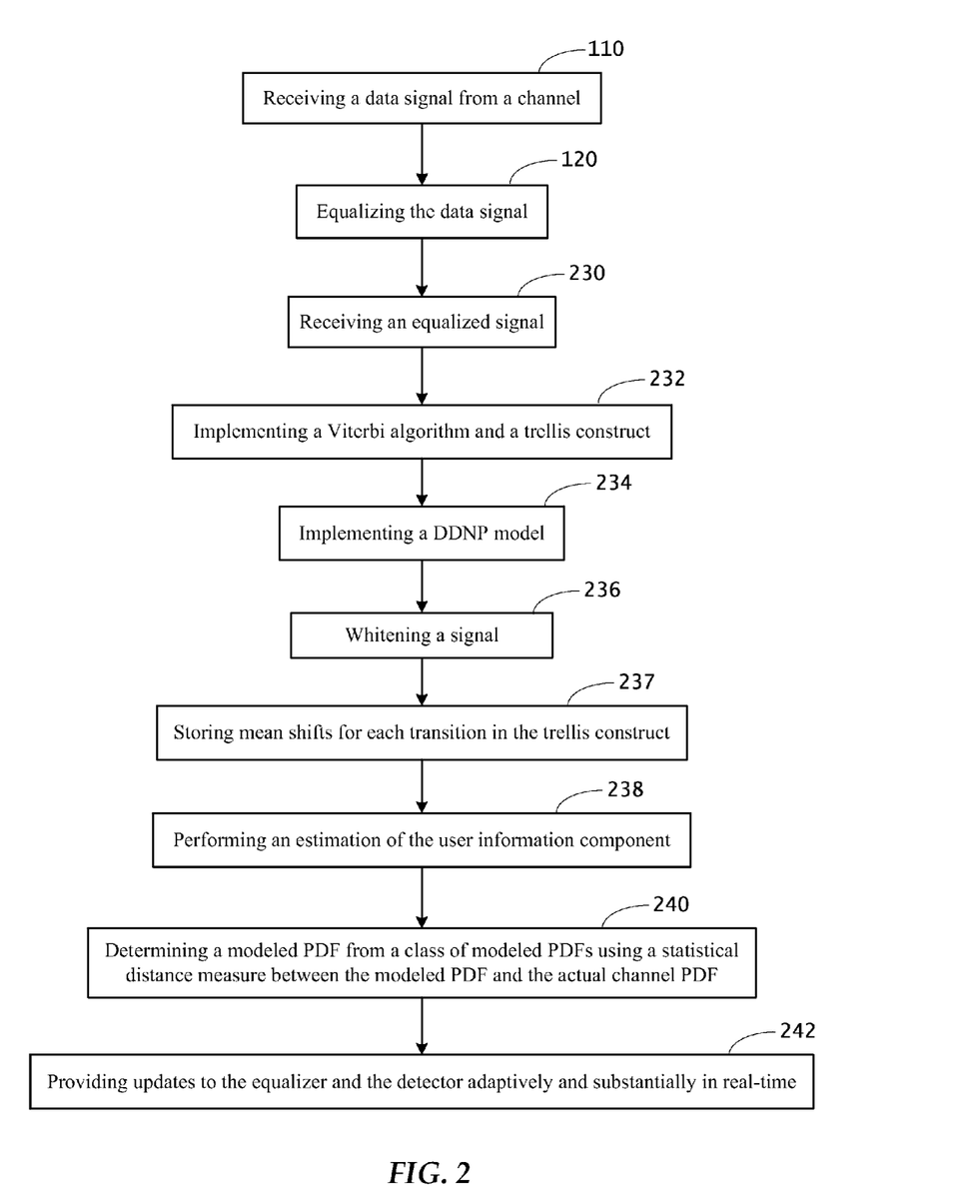
FIG. 2 shows various processes for jointly calibrating an equalizer and a detector coupled to a channel in accordance with other embodiments.

FIG. 2 shows various processes for jointly calibrating an equalizer and a detector in accordance with embodiments of the disclosure. The method shown in FIG. 2 involves receiving 110 a data signal from a channel by an equalizer. The data signal comprises inter-symbol interference (ISI) and a data-dependent noise component. After equalizing 120 the data signal using the equalizer, the effect of the ISI is removed. To detect a user information component of the data signal, the method of FIG. 2 further involves receiving 230 an equalized signal from the equalizer and performing 238 an estimation of the user information component.

According to various embodiments, estimating 238 the user information component with enhanced accuracy involves implementing 232 a Viterbi algorithm, a trellis construct comprising states and transitions among the states, and a data-dependent noise predictive (DDNP) model 234. The Viterbi algorithm is used to determine the most likely Viterbi path by calculating the probability of a sequence of transitions among states. The DDNP model makes use of the data-dependent noise component of the signal to support Viterbi path metric calculations. Before performing 238 the estimation, a signal is whitened 236 to reduce auto-correlation, and mean shifts for each transition in the trellis construct are stored 237 for the calibration (next round update). After the user information component is detected 238, the equalizer and the detector are calibrated to enhance the accuracy of a subsequent detection operation (next round detection).

According to various embodiments, the method illustrated in FIG. 2 involves determining 240 a modeled PDF from a class of modeled PDFs using a statistical distance measure between the modeled PDF and the actual channel PDF. The determined PDF preferably has the minimum Kullback-Leibler (KL) distance to the actual channel PDF. The metric used to determine this PDF is called minimum relative entropy. The MRE metric is used to find a PDF matching the channel PDF as close as possible, to jointly design the equalizer and the detector. Finally, updates are preferably provided 242 to the equalizer and the detector adaptively and substantially in real-time.

In accordance to various embodiments, the equalizer is configured to perform equalization without using a partial response target. A joint calibration approach consistent with embodiments of the disclosure optimizes the equalizer and the detector with no need for a conventional two-step calibration. The method according to FIG. 2 can be applied to any channel, and thus can be viewed as a universal approach. The data signal can be acquired from a communication channel, for example, or comprise a read-back signal acquired from a magnetic recording medium.

Various entropy-based design methodologies are contemplated, including those that use a numerical MRE design algorithm and those that use an adaptive MRE design algorithm. In general terms, a numerical entropy-based design algorithm is a computationally efficient semi-analytical solution, where each step of the iteration has an analytical solution. A numerical MRE design algorithm, for example, works iteratively by repeating the following processes until convergence occurs: (a) pivot the equalizer to optimize the DDNP model, then pivot the DDNP model to re-optimize the equalizer. A numerical MRE design approach is suitable for off-line calibration since it requires all the training data to be available and is computationally demanding. A numerical MRE design algorithm is typically not suitable for real-time implementation, such as in a magnetic recording device incorporated in a computer system or an active communication channel.

An adaptive MRE design algorithm is suitable for real-time applications. For implementations that employ an adaptive MRE design algorithm, a "suboptimal" MRE metric is used. Although producing a so-called "suboptimal" MRE metric, an adaptive MRE design algorithm has lower implementation complexity and virtually the same detection performance as a numerical MRE design algorithm that produces an "optimal" MRE metric. A representative "suboptimal" MRE metric is described below under the heading Minimum Relative Entropy Design.

Figure 3:
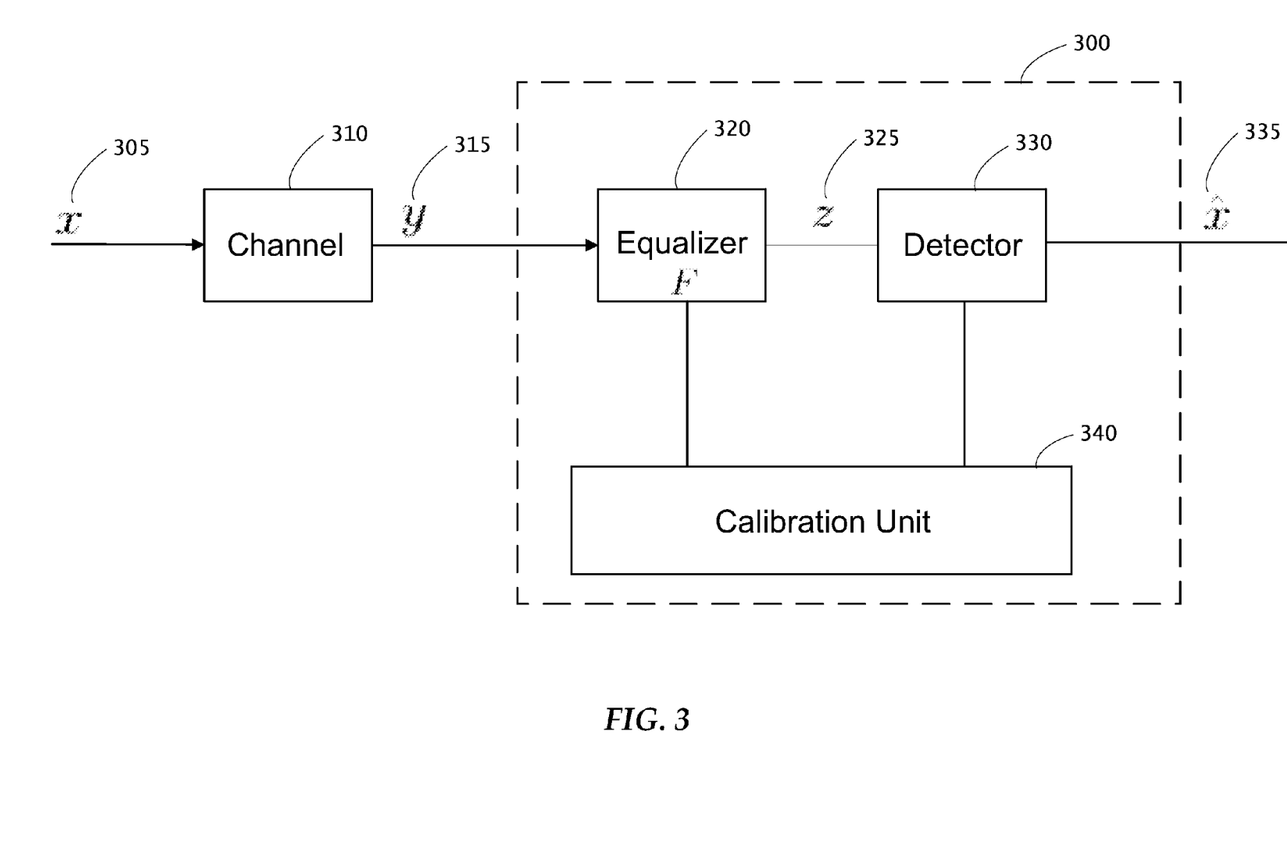
FIG. 3 shows an apparatus for performing joint calibration using an entropy-based metric in accordance with various embodiments.

Representative Joint Calibration Approach:

FIG. 3 shows an apparatus 300 for performing joint calibration using minimum relative entropy in accordance with various embodiments. The apparatus 300 shown in FIG. 3 includes an equalizer 320 and a detector 330 coupled to the equalizer 320. The equalizer 320 receives a data signal from a channel 310. The apparatus 300 further includes a calibration unit 340 coupled with the equalizer 320 and the detector

330. The calibration unit 340 is configured to jointly calibrate the equalizer 320 and the detector 330 using the MRE metric. A more detailed description of the MRE design according to various embodiments is provided below.

Relative Entropy:

With continued reference to FIG. 3, let the actual (uncharacterized) channel 310 and its modeled PDFs be denoted by:

$$P(x_1^N, y_1^N) = P(x_1^N) P(y_1^N | x_1^N) \text{(actual channel)}$$

$$\tilde{P}(x_1^N, y_1^N) = P(x_1^N) \tilde{P}(y_1^N | x_1^N) \text{(modeled channel)}$$

According to embodiments where the channel is a read channel, for example, x (305) represents channel bits, y (315) represents a read-back signal, z (325) represents an equalized signal, and $\hat{x}$ (335) represents detected bits.

The best PDF, $\tilde{P} \in \mathcal{P}$, in a given class of PDFs, $\mathcal{P}$, is the one that minimizes the relative entropy (or KL distance), as given by:

$$\underset{\tilde{P} \in \mathcal{P}}{\operatorname{argmin}} - \sum_{x_1^N} \int_{y_1^N} P(x_1^N, y_1^N) \log \left[ \frac{\tilde{P}(y_1^N | x_1^N)}{P(y_1^N | x_1^N)} \right] d y_1^N =$$

$$\underset{\tilde{P} \in \mathcal{P}}{\operatorname{argmax}} E \log \left[ \frac{\tilde{P}(y_1^N | x_1^N)}{P(y_1^N | x_1^N)} \right] = \underset{\tilde{P} \in \mathcal{P}}{\operatorname{argmax}} E \log \tilde{P}(y_1^N | x_1^N)$$

Problem Formulation:

The equalized signal $z = f \star y$ (where $\star$ denotes convolution or filtering) is modeled as a signal-dependent Gaussian autoregressive (SDAR) process, given by:

$$\tilde{P}(z_1^N | x_1^N) = \prod_n \tilde{P}(z_n | z_{n-L}^{n-1}, x_{n-M}^n)$$

$$\tilde{P}(z_n | z_{n-L}^{n-1}, T_n) = \frac{1}{\sqrt{2\pi\sigma^2(T_n)}} \exp\left(-\frac{1}{2\sigma^2(T_n)} \left| \sum_{l=0}^{L} w_l(T_n) z_{n-l} - \mu(T_n) \right|^2 \right)$$

where the transition pattern is given by: $T_n = x_n^n - M$, the variance is given by $\sigma^2(T_n)$, whitening filter taps are given by $w_l(T_n)$, and means shift is given by $\mu(T_n)$. We seek the parameters (FIR equalizer and DDNP model) that minimize the relative entropy metric.

Technical Result:

Lemma: Let $z = f \star y$ for a stable filter f. Then:

$$\frac{1}{N} \log \tilde{P}(z_1^N) = \frac{1}{N} \log \tilde{P}(y_1^N) - \log f_o$$

$$\log f_o = \frac{1}{2\pi} \int_{-\pi}^{\pi} \log |F(\omega)| d\omega$$

where $f_o = f_{mp}[0]$ is the leading tap of the minimum phase spectral factor of $|F_{mp}(\omega)|^2 = |F(\omega)|^2$. The same result also holds for conditional PDFs:

$$\frac{1}{N} \log \tilde{P}(z_1^N | x_1^N) = \frac{1}{N} \log \tilde{P}(y_1^N | x_1^N) - \log f_o$$

$$\Rightarrow \underbrace{\frac{1}{N} E \log \tilde{P}(z_1^N | x_1^N)}_{\text{To be maximized}} = \frac{1}{N} E \log \tilde{P}(y_1^N | x_1^N) + \log f_o$$

Minimum Relative Entropy Design:

The problem can be re-casted as a joint maximization:

$$\underset{f, \tilde{P} \in \mathcal{P}}{\operatorname{argmax}} \left[ \frac{1}{N} E \log \tilde{P}(z_1^N | x_1^N) + \log f_o \right]$$

Given a sufficiently long training sequence, we can drop the expectation (Shannon-McMillan-Breiman Theorem) above:

$$\underset{f, \tilde{P} \in \mathcal{P}}{\operatorname{argmax}} \left[ \frac{1}{N} \log \tilde{P}(z_1^N | x_1^N) + \log f_o \right]$$

The term $\log f_o$ ensures that we don't obtain the trivial solution f=0. In fact, the above problem is equivalent to:

$$\underset{f, \tilde{P} \in \mathcal{P}}{\operatorname{argmax}} \log \tilde{P}(z_1^N | x_1^N) \text{ subject to } f_o = 1$$

The problem can be written as a nested maximization:

$$\max_f \max_{\tilde{P} \in \mathcal{P}} \log \tilde{P}(z_1^N | x_1^N) \text{ subject to } f_o = 1$$

For a given f, the standard DDNP training already solves the inner minimization. It can be shown that the outer problem reduces to:

$$f_{MRE} = \underset{f}{\operatorname{argmin}} \frac{1}{N_T} \sum_T \frac{1}{2} \log \sigma^2(T) \text{ subject to } f_o = 1$$

For a suboptimal metric suitable for use in a real-time adaptive implementation (e.g., a communication channel or a read channel of a magnetic recording system), the logarithm can be dropped to minimize the average DDNP variance instead:

$$f_{MRE} = \underset{f}{\operatorname{argmin}} \frac{1}{N_T} \sum_T \frac{1}{2} \sigma^2(T) \text{ subject to } f_o = 1$$

Equalizer Decomposition:

Various embodiments of the disclosure are directed to a calibration unit coupled with an equalizer and a detector, wherein the calibration unit is configured to jointly calibrate the equalizer and the detector using a metric subject to an entropy-preserving equalizer constraint. The calibration unit is preferably configured to produce a decomposition that satisfies the entropy-preserving equalizer constraint, such as by producing a decomposition using a causal factor, an anti-causal factor, and a delay factor. The calibration unit can be configured to produce the decomposition using a monic and minimum-phase factor, a monic and maximum-phase factor, and a delay factor, a representative example of which is given below.

In the following example, an equalizer f, such as an MRE equalizer f, has the following entropy-preserving normalization constraint in the frequency domain:

$$\log f_o = \frac{1}{2\pi} \int_{-\pi}^{\pi} \log |F(\omega)| d\omega = 0$$

It is understood, however, any FIR f satisfying the above constraint can be uniquely decomposed as:

$$f[n] = f_c[n] \star f_a[n] \star \delta[n-d]$$

$f_c[n]$=causal, minimum-phase and monic $f_c[0]=1$
$f_a[n]$=anticausal, maximum-phase and monic $f_c[0]=1$
$\delta[n-d]$=delay of d samples
The optimization is solved over the triplet $(f_c, f_a, d)$ which has simpler constraints.
Delay Optimization:

The optimal delay d needs to be determined before performing the adaptation. One approach to determining the optimal delay d involves manually searching over a range of values in the vicinity of the origin: $-d_{max} \leq d \leq d_{max}$, $d_{max}=1$ or 2, although other approaches are contemplated. In simulation environments, d is usually 0. This, however, is not guaranteed with real data since it depends on the timing recovery blocks.
Numerical MRE Design Methodology:

Below is a representative example of a numerical MRE design algorithm in accordance with various embodiments:
 Collect long training sequences $x_1^N$ and $y_1^N$.
 Pick an initial equalizer $f[n]=\delta[n]$.
 repeat
 Find the best $\mu(T)$ and $p_f(T)$ for current f.
 Find the best f and $\mu(T)$ for current $p_f(T)$.
 until convergence
We optimize over the DDNP means $\mu(T)$ in both steps since it significantly improves convergence rate.
Summary of MRE Design:

Summarizing the final result, the MRE design according to various embodiments essentially solves:

$$f_{MRE} = \underset{f}{\operatorname{argmin}} \frac{1}{N_T} \sum_T \frac{1}{2} \log \sigma^2(T)$$

where $F(z)=z^{-d}F_\alpha(z)F_c(z)$. It is noted that that $\sigma^2(T)$ is not a simple function of f. The term $\sigma^2(T)$ depends implicitly on f through the optimal DDNP model parameters. This problem is solved iteratively, such as in the following way:
 1. For a given equalizer, the standard DDNP training is run.
 2. For the resulting DDNP model, the equalizer is re-optimized.
 3. This process is repeated until convergence.

Figure 4:
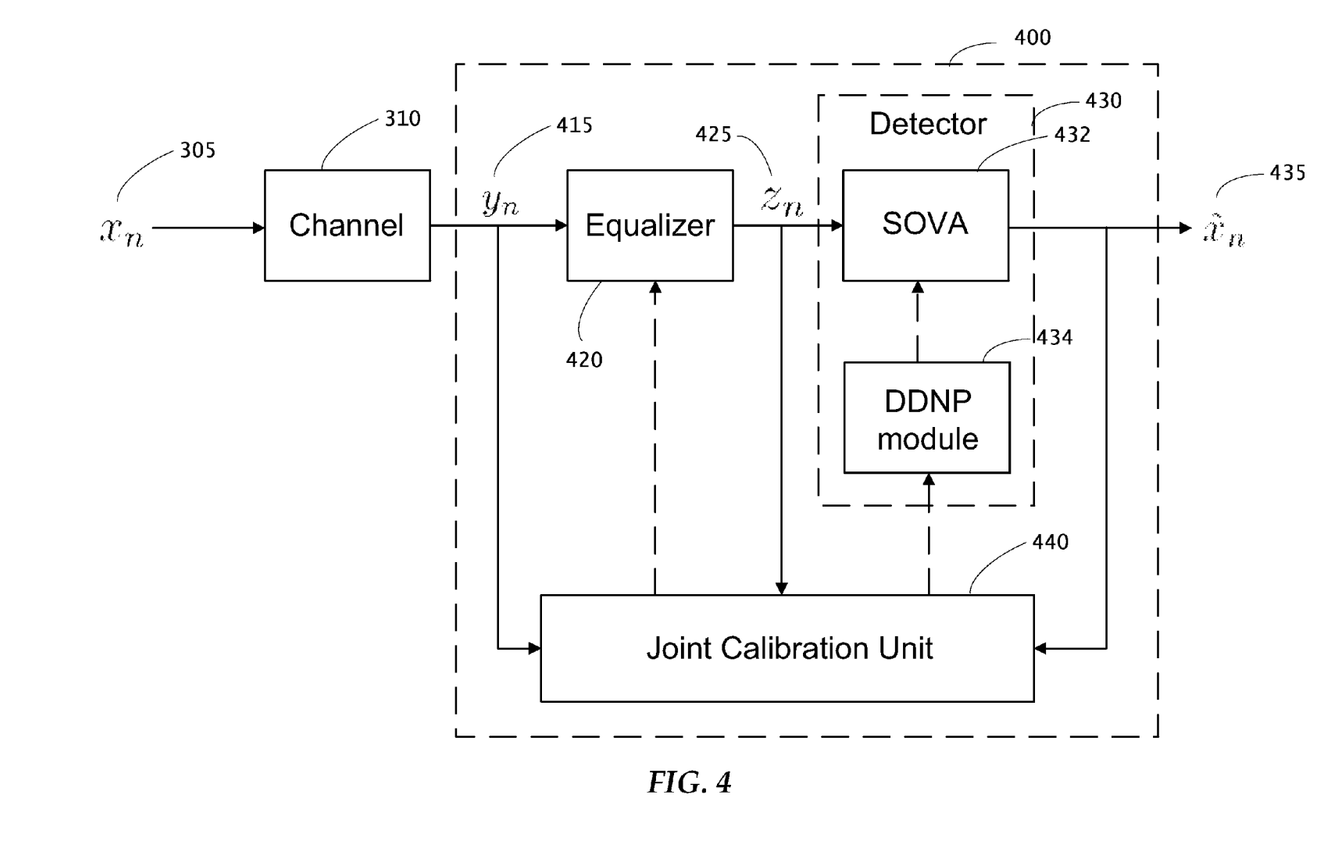
FIG. 4 shows an apparatus for performing joint calibration using an entropy-based metric in accordance with other embodiments.

FIG. 4 shows an embodiment of an apparatus 400 for performing joint calibration using minimum relative entropy (MRE) in accordance with various embodiments. The embodiment shown in FIG. 4 includes an equalizer 420 and a detector 430 coupled to the equalizer 420. The equalizer 420 receives a data signal $y_n$ 415 from a channel 310. The data signal $y_n$ 415 comprises a data-dependent noise component and a user information component $x_n$ 305 with inter-symbol interference (ISI). The channel 310 can be a communication channel or a read channel of a magnetic recording device, for example. The detector 430 receives an equalized signal $z_n$ 425 from the equalizer 420 and performs an estimation of the user information component $x_n$ 305 to achieve an estimate $\tilde{x}_n$ 435 of the user information component.

The detector 430 comprises a soft output Viterbi algorithm (SOVA) module 432 and a data-dependent noise predictive (DDNP) module 434 coupled with the SOVA module 432.

The SOVA module 432 is configured to implement a Viterbi algorithm and a trellis construct comprising states and transitions among the states. The DDNP module 434 comprises a whitening filter and a storage device configured to store mean shifts for each transition in the trellis construct.

Figure 5:
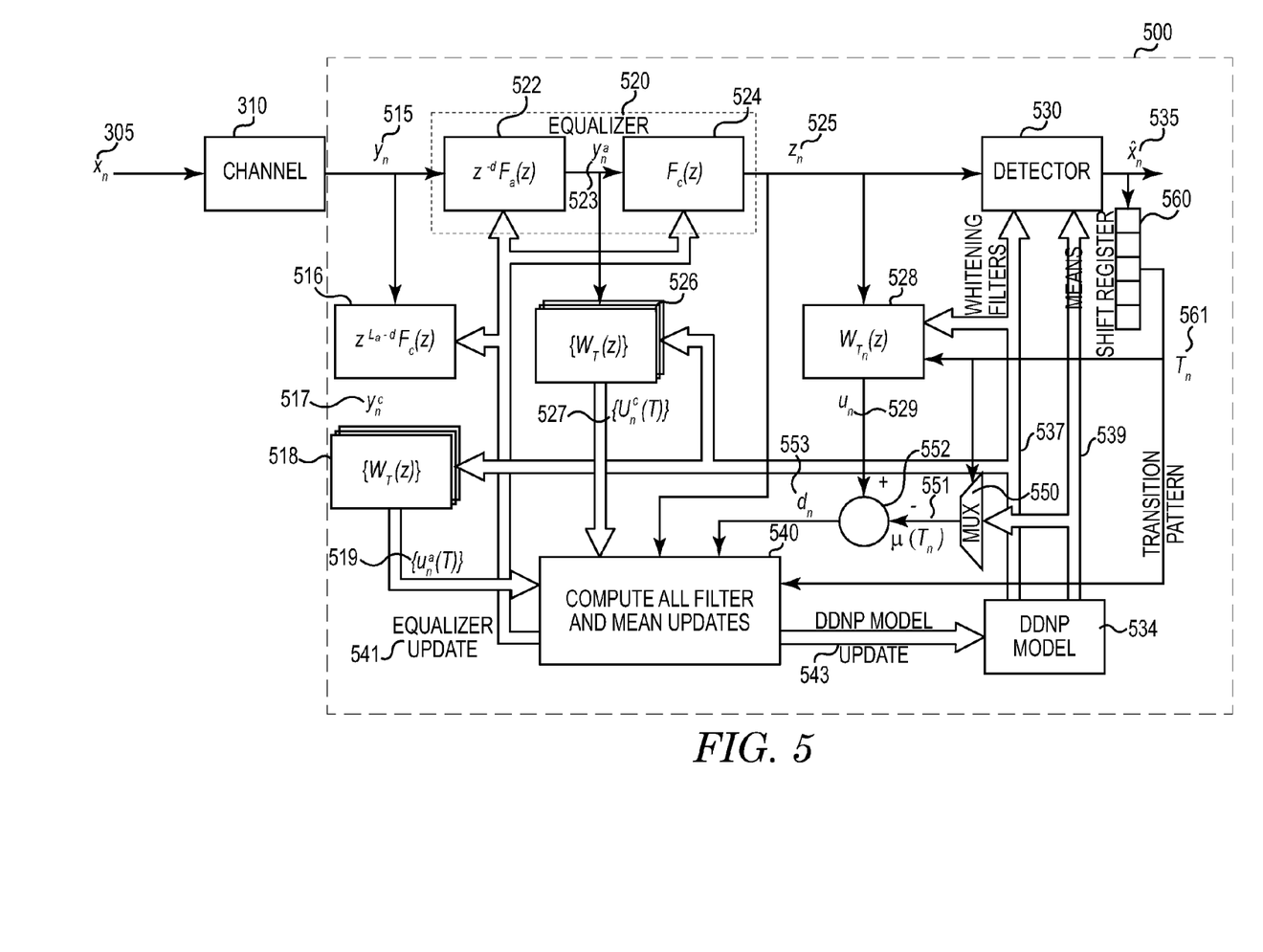
FIG. 5 shows an embodiment of an apparatus for performing joint calibration using an entropy-based metric in accordance with various embodiments.

The apparatus 400 further includes a calibration unit 440 coupled with the equalizer 420 and the detector 430. The calibration unit 440 is configured to jointly calibrate the equalizer 420 and the detector 430 using the MRE metric. The MRE metric is used to find a modeled PDF matching an actual PDF of the channel 310 as close as possible, to jointly calibrate the equalizer 420 and the detector 430. The calibration unit 440 is configured to determine the closest modeled PDF to the actual PDF of the channel from a class of modeled PDFs. The determined PDF preferably has the minimum Kullback-Leibler distance to the PDF of the channel. The calibration unit 440 comprises an algorithm module configured to provide updates to the equalizer 420 and the detector 430. According to various embodiments, the joint calibration unit 440 optimizes the equalizer 420 and the detector 430 with no need for a two-step calibration and no need of a partial response (PR) target. The calibration unit 440 implements the metric of MRE or KL distance, which is an optimal design metric.
Adaptive MRE Methodology:

FIG. 5 shows an embodiment of an apparatus for performing joint calibration using minimum relative entropy (MRE) in accordance with various embodiments. In addition to the components shown in the embodiment of FIG. 4, the apparatus 500 illustrated in FIG. 5 includes a structure for implementing an adaptive MRE design. The equalizer 520 comprises a causal equalizer $F_c(z)$ 524 and an anti-causal equalizer $z^{-d}F_\alpha(z)$ 522. The calibration unit 540 implements an adaptive algorithm module configured to provide updates to the equalizer 520 and the detector 530 substantially in real-time.

A numerical MRE design algorithm discussed previously is suitable for offline calibration since it requires all the training data to be available and it typically not suitable for real-time implementation. FIG. 5 illustrates an adaptive MRE design algorithm that uses a suboptimal MRE metric that is well-suited for simplified real-time implementations.

At a time n, the apparatus 500 computes all the following quantities:
applying filter 522 to $y_n$ (515) yields $y_n^a$ (523):

$$y_n^a = \sum_{l=0}^{L_a} f_{a,-l} y_{n+l-d}$$

applying filter 524 to $y_n^a$ (523) yields equalized signal $Z_n$ (525):

$$z_n = \sum_{l=0}^{L_c} f_{c,l} y_{n-l}^a$$

applying filter 526 to $y_n^a$ (523) for each $T \in \mathcal{T}$ yields $u_n^c(T)$ (527):

$$u_n^c(T) = \sum_{l=0}^{L} w_l(T) y_{n-l}^a, \forall T$$

applying filter 516 to $y_n$ (515) yields $y_n^c$ (517):

$$y_n^c = \sum_{l=0}^{L_c} f_{c,l} y_{n+L_a-l-d}$$

applying filter 518 to $y_n^c$ (517) for each $T \in \mathcal{T}$ yields $u_n^a(T)$ (519):

$$u_n^a(T) = \sum_{l=0}^{L} w_l(T) y_{n-l}^c, \forall T$$

applying filter 528 to $z_n$ (525) yields $u_n$ (529):

$$u_n = \sum_{l=0}^{L} w_l(T_n) z_{n-l}$$

applying $u_n$ (529) and $\mu(T_n)$ (551) to summer 552 yields $d_n$ (553):

$$d_n = u_n - \mu(t_n)$$

Having computed the above quantities, the calibration unit 540 performs all filter and mean updates. The updates include updates to:
  the DDNP mean $\mu(T_n) \leftarrow \mu(T_n) + 2\alpha_\mu d_n$
  the DDNP whitening taps $w_l(T_n) w_l(T_n) 2\alpha_w d_n z$
  the causal equalizer factor $f_{c,l} - 2\alpha_c d_n u_n(T_n)$
  the anti-causal equalizer factor $f_{a,-l} \leftarrow f_{a,-1} - 2\alpha_a d_n(T_n)$ The delayed quantities above, $z_{n-l}$, $u_{n-l}^a(t_n)$, and $u_u(T_n)$, are preferably stored and fetched using buffers. It is noted that the step sizes $\alpha_\mu$, $\alpha_w$, $\alpha_c$ and $\alpha_a$ can be chosen independently. The best choice of step sizes is typically found by simulations based on the actual training data. The calibration unit 540 preferably comprises a module implementing a least mean square (LMS) algorithm.

Figure 6:
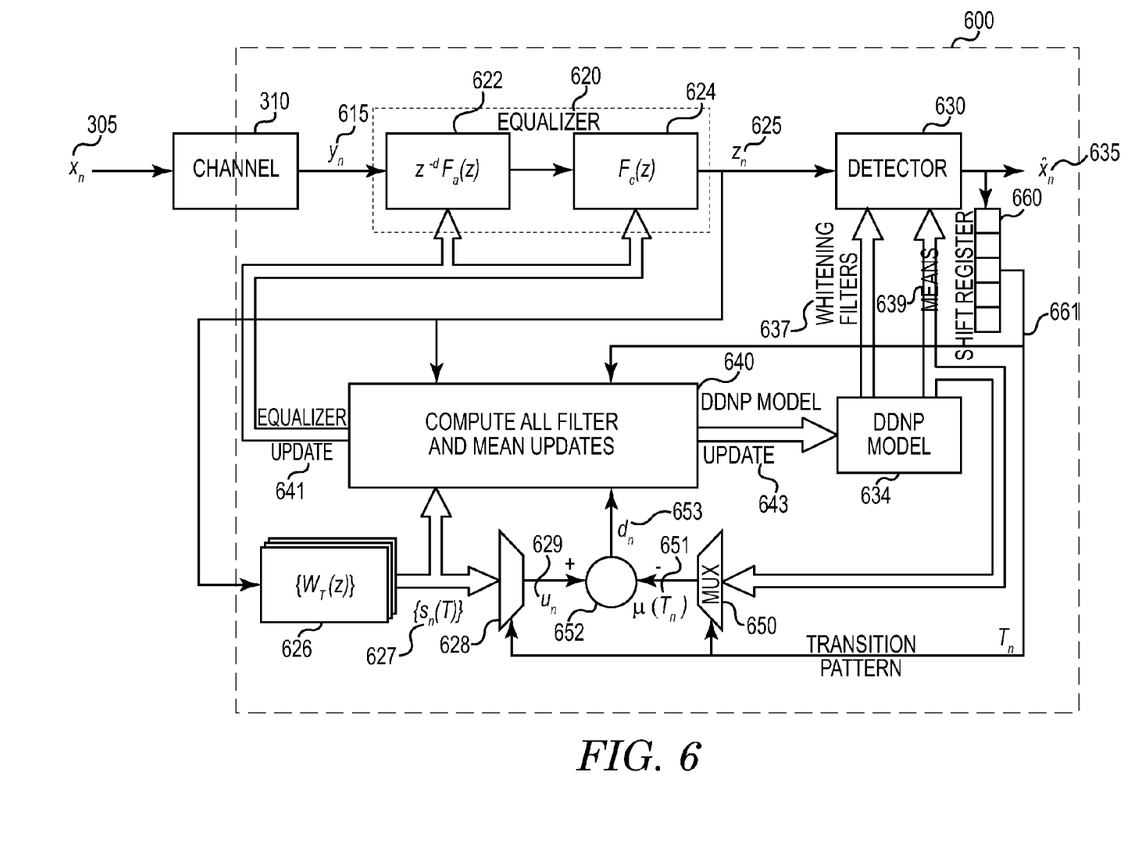
FIG. 6 shows an embodiment of an apparatus for performing joint calibration using an entropy-based metric in accordance with other embodiments.

Variant Adaptive MRE Methodology:

FIG. 6 shows an embodiment of an apparatus for performing joint calibration using minimum relative entropy in accordance with other embodiments. The apparatus 600 illustrated in FIG. 6 includes a structure for implementing a variant adaptive MRE design of an equalizer 620 and a detector 630 in accordance with various embodiments. The apparatus 600 in FIG. 6 has a higher computational efficiency and simpler implementation than the apparatus 500 in FIG. 5.

For example, and with reference once again to FIG. 5, the two filters 518 and 526 $\{W_T(z)\}$ represent a collection of filters (one for each transition in the trellis). Use of this collection of filters makes the computation of $u_n^c(T)$ (527) and $u_n^a(T)$ (519) for each transition T computationally expensive. The variant adaptive MRE methodology of FIG. 6 eliminates these signals and typically has a lower implementation complexity than the standard adaptive MRE architecture discussed above. In particular, the variant adaptive MRE design shown in FIG. 6 has one collection of signals, $\{s_n(T)\}$ as opposed to two $\{u_n^c(T)\}$ and $\{u_n^a(T)\}$, and all updates are computed using the signals $z_n$ and $d_n$, and the signal collection $\{S_n(T)\}$.

In additional to the equalizer output $z_n$ (625), and skipping the equivalent computations of FIG. 5 for simplicity of explanation, the following computations are made by the variant adaptive MRE design implemented by apparatus 600 at a time n:

the collection of signals, $s_n(T)$ (627), is given by:

$$s_n(T) = \sum_{l=0}^{L} z_n - |w|(T), \forall T$$

the delay, $d_n$ (653), is given by:

$$d_n = s_n(T_n) - \mu(T_n)$$

the causal equalizer factor, $\Delta c_{c,k}$, associated with filter 624 of the equalizer 620 is given by:

$$\Delta c_{c,k} = -2\alpha_c d_n s_n k(T_n), 1 \le k \le L_c$$

the anti-causal equalizer factor, $\Delta \epsilon_{a-k}$, associated with filter 622 of the equalizer 620 is given by:

$$\Delta \epsilon_{a,-k} = -2\alpha_\alpha d_n s_{n|k}(T_n), 1 \le k \le L_\alpha,$$

noting that the anti-causal factor expressions above depends on the same signal, $s_n(T)$ (627), that is already computed for the casual factor expression.

Having computed the above quantities, the calibration unit 640 performs all filter and mean updates. The updates include updates to:
  the filter $F_c(z)$ 624 by $f_{c,l} \leftarrow f_{c,l} - \alpha_c(e_c * f_c)_l, 0 \le l \le L_c$
  the filter $F_a(z)$ 622 by $f_a(l) \leftarrow f_{a,-l} - \alpha_a(e_a * f_a)_{-l}, 0 \ge l \ge -L_n$
  the DDNP whitener $W_l(T_n) \leftarrow W_l(T_u) - \alpha_w d_n z_{n-l}, 0 \le l \le L$
  the DDNP means $\mu(T_n) \leftarrow \mu(T_n) + \alpha_\mu d_n$ The delayed quantities above, $s_{u-k}(T_u)$ and $S_{\mu|k}(T_u)$, are preferably stored and fetched using buffers. It is noted that the step sizes $\alpha_\mu$, $\alpha_\omega$, $\alpha_c$ and $\Omega_a$ can be chosen independently. The best choice of step sizes is typically found by simulations based on the actual training data. The calibration unit 640 preferably comprises a module implementing a least mean square (LMS) algorithm.

The embodiments discussed herein above are described as using an entropy-based metric to jointly calibrate a channel equalizer and detector. It is understood that a variety of statistical distance measures may be used in the context of various embodiments, including any of the following: f-divergence, Hellinger distance, total variation distance, Rényi's divergence, Jensen-Shannon divergence, Lêvy-Prokhorov metric, Bhattacharyya distance, Wasserstein metric, energy distance, signal-to-noise ratio distance, Mahalanobis distance, distance correlation, continuous ranked probability scoring, and Lukaszyk-Karmowski metric.

It is to be understood that even though numerous characteristics and advantages of various embodiments disclosed herein have been set forth in the foregoing description, together with details of the structure and function of various embodiments, this detailed description is illustrative only, and changes may be made in detail, especially in matters of structure and arrangements of parts within the principles of the presently disclosed subject matter to the full extent indicated by the broad general meaning of the terms in which the appended claims are expressed.

What is claimed is:
1. An apparatus, comprising:
  an equalizer configured to receive a data signal from a channel;
  a detector coupled to the equalizer; and
  a calibration unit coupled with the equalizer and the detector, the calibration unit configured to jointly calibrate the equalizer and the detector using a metric subject to an entropy-preserving equalizer constraint.

2. The apparatus of claim 1, wherein the calibration unit is configured to produce a decomposition that satisfies the entropy-preserving equalizer constraint.

3. The apparatus of claim 2, wherein the calibration unit is configured to produce the decomposition using a causal factor, an anticausal factor, and a delay factor.

4. The apparatus of claim 2, wherein the calibration unit is configured to produce the decomposition using a monic and minimum-phase factor, a monic and maximum-phase factor, and a delay factor.

5. The apparatus of claim 1, wherein the metric comprises an entropy-based metric.

6. The apparatus of claim 1, wherein the metric is representative of a statistical distance measure between a modeled probability distribution functions (PDF) and an actual channel PDF.

7. The apparatus of claim 6, wherein the calibration unit is configured to determine a PDF from a class of modeled PDFs using the statistical distance measure.

8. The apparatus of claim 7, wherein the statistical distance measure comprises a Kullback-Leibler distance or relative entropy.

9. The apparatus of claim 1, wherein the detector comprises a soft output Viterbi algorithm (SOVA) module configured to implement a Viterbi algorithm and a trellis construct comprising states and transitions among the states.

10. The apparatus of claim 9, wherein the detector comprises a data-dependent noise predictive (DDNP) module coupled with the SOVA module.

11. The apparatus of claim 10, wherein the DDNP module comprises a whitening filter and a storage device configured to store mean shifts for each transition in the trellis construct.

12. The apparatus of claim 1, wherein the equalizer is configured to receive the data signal from a read channel of a data storage device.

13. The apparatus of claim 1, wherein the equalizer is configured to perform equalization without using a partial response target.

14. A method, comprising:
receiving a data signal from a channel by an equalizer;
equalizing the data signal using the equalizer;
detecting a user information component of the data signal using a detector; and
calibrating the equalizer and the detector jointly using an entropy-based metric subject to an entropy-preserving equalizer constraint.

15. The method of claim 14, wherein calibrating comprises producing a decomposition that satisfies the entropy-preserving equalizer constraint.

16. The method of claim 15, wherein the decomposition is produced using a causal factor, an anticausal factor, and a delay factor.

17. The method of claim 14, wherein the entropy-based metric is representative of a statistical distance measure between a modeled PDF and an actual channel PDF, the statistical distance measure comprising a Kullback-Leibler distance or relative entropy.

18. The method of claim 14, wherein calibrating the equalizer and the detector jointly comprises providing updates to the equalizer and the detector adaptively and substantially in real-time.

19. The method of claim 14, wherein the data signal is acquired from a magnetic recording medium.

20. The method of claim 14, wherein equalizing comprises equalizing the data signal without using a partial response target.

* * * * *